United States Patent [19]

Ezaki et al.

[11] Patent Number: 5,268,799
[45] Date of Patent: Dec. 7, 1993

[54] MAGNETIC RECORDING AND REPRODUCING APPARATUS

[75] Inventors: Joichiro Ezaki, Saku; Kazumasa Fukuda, Komoro; Masanori Sakai, Miyota, all of Japan

[73] Assignee: TDK Corporation, Tokyo, Japan

[21] Appl. No.: 17,997

[22] Filed: Feb. 16, 1993

Related U.S. Application Data

[63] Continuation of Ser. No. 762,260, Sep. 20, 1991, abandoned, which is a continuation of Ser. No. 316,143, Feb. 27, 1989, abandoned.

[51] Int. Cl.$^5$ .............................. G11B 5/54; G11B 5/82
[52] U.S. Cl. ..................................... 360/75; 360/103; 360/135
[58] Field of Search .................... 360/75, 97.01, 97.02, 360/102, 103, 131, 133, 135

[56] References Cited

U.S. PATENT DOCUMENTS

| | | | |
|---|---|---|---|
| 4,803,577 | 2/1989 | Ezaki et al. | 360/135 |
| 4,833,550 | 5/1989 | Takizawa et al. | 360/75 |
| 4,907,106 | 3/1990 | Yamada | 360/75 |
| 4,918,556 | 4/1990 | Ezaki et al. | 360/103 |

FOREIGN PATENT DOCUMENTS

| | | | |
|---|---|---|---|
| 58-164030 | 9/1983 | Japan | 360/135 |
| 62-24069 | 2/1986 | Japan | 360/75 |
| 61-276182 | 12/1986 | Japan | 360/75 |
| 63-0117318 | 5/1988 | Japan | 360/135 |
| 63-193388 | 8/1988 | Japan | 360/75 |
| 2179486 | 3/1987 | United Kingdom | 360/135 |

*Primary Examiner*—Jerry Smith
*Assistant Examiner*—Steven R. Garland
*Attorney, Agent, or Firm*—Oblon, Spivak, McClelland, Maier & Neustadt

[57] ABSTRACT

In a magnetic recording and reproducing apparatus of a type wherein a magnetic disk having a magnetic recording layer formed on a rigid substrate is rotated at a high speed and magnetic recording and reproduction are conducted by the magnetic head disposed on the surface of the disk, the magnetic recording and reproducing apparatus being characterized in that the magnetic recording and reproducing are conducted by the magnetic head which is caused to fly from the magnetic disk at at least an area of the outermost cylinder of the magnetic disk and is caused to be substantially in contact with the surface of magnetic disk at at least an innermost cylinder of the magnetic disk.

13 Claims, 3 Drawing Sheets

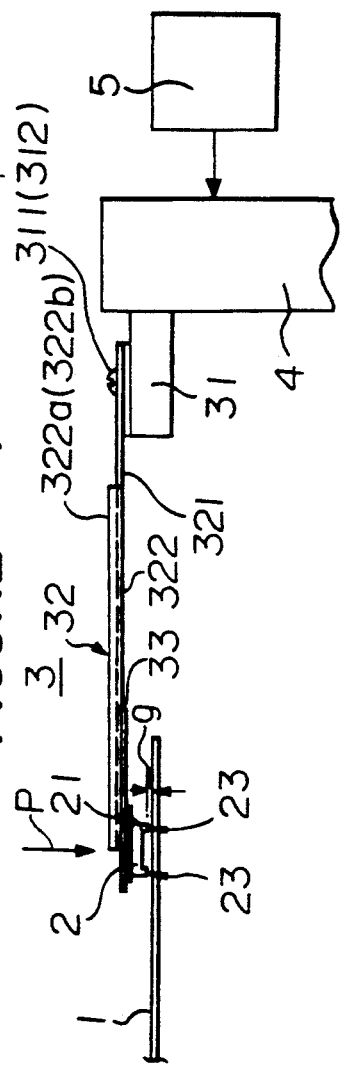
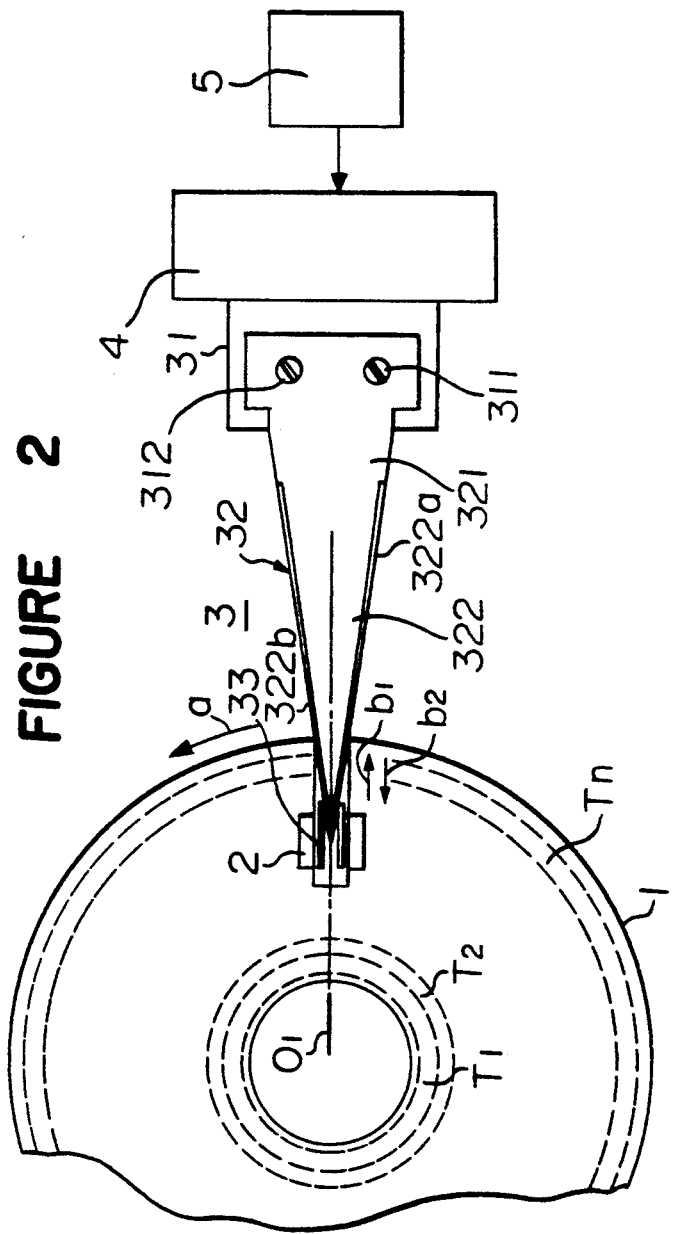

MAGNETIC RECORDING AND REPRODUCING APPARATUS

This application is a continuation of application Ser. No. 07/762,260, filed on Sep. 20, 1991, now abandoned, which is a continuation of ser. No. 07/316,143, filed on Feb. 27, 1989 now abandoned.

BACKGROUND OF THE INVENTION

1. Field of the Invention

The present invention relates to a magnetic recording and reproducing apparatus of a type wherein magnetic recording and reproducing are conducted by a magnetic head disposed on the surface of a magnetic disk of a rigid substrate while the disk is rotated at a high speed. Particularly, it relates to such apparatus wherein recording and reproducing are conducted by a magnetic head which is caused to fly at at least the outermost track of the magnetic disk and is caused to be in contact with the surface of the magnetic disk at at least the innermost track, whereby the durability of the magnetic disk and the magnetic head can be improved, the spacing loss can be reduced, and high density recording is made possible.

As is well known, in a magnetic recording and reproducing apparatus of this type, a hard magnetic disk comprising a rigid substrate made of aluminum and a thin magnetic layer formed thereon by a method such as a fine magnetic powder coating method, a plating method or a sputtering method, is rotated at a high speed (e.g. 3600 rpm) so as to produce a dynamic pressure between the magnetic disk and a flying magnetic head so that the magnetic head is lifted and floats with a certain flying height by a fine air bearing, while the magnetic recording and reading are conducted.

In order to accomplish high density magnetic recording with a magnetic recording and reproducing apparatus of this type, it is necessary to minimize the flying height of the magnetic head and to reduce the spacing loss.

As a conventional technique to obtain high density magnetic recording by reducing a flying height of the magnetic head, there is known one as disclosed in, for instance, Japanese Unexamined Patent Publication No. 287002/1986. In the known technique, recording and reproducing are conducted by bringing magnetic head into contact in substantial meaning with a magnetic disk with a magnetic recording layer formed on a rigid substrate while the head and the disk are relatively moved at a high speed.

In accordance with the above-mentioned conventional technique, the spacing loss can be made small and excellent recording and reproducing characteristics and recording density characteristics are obtainable. However, the conventional technique adapted to perform recording and reproducing by bringing the magnetic head substantially in contact with the surface of the magnetic disk has a problem such as a damage to the magnetic disk or a head crash and the durability tends to be low. Especially, such risk is large when the surface of the magnetic disk is composed of a metal or alloy such as Co-Cr or the like.

The present invention is to eliminate the above-mentioned problem and is to provide a magnetic recording and reproducing apparatus of a type wherein a magnetic disk having a magnetic recording layer formed on a rigid substrate is rotated at a high speed and magnetic recording and reproduction are conducted by the magnetic head disposed on the surface of the disk, the magnetic recording and reproducing apparatus being characterized in that the magnetic recording and reproducing are conducted by the magnetic head which is caused to fly from the magnetic disk at at least an area of the outermost cylinder of the magnetic disk and is caused to be substantially in contact with the surface of magnetic disk at at least an innermost cylinder of the magnetic disk.

BRIEF DESCRIPTION OF THE DRAWINGS

FIG. 1 is a front view of a magnetic recording and reproducing apparatus of the present invention;

FIG. 2 is a plan view thereof;

EMBODIMENTS

Figure 3:
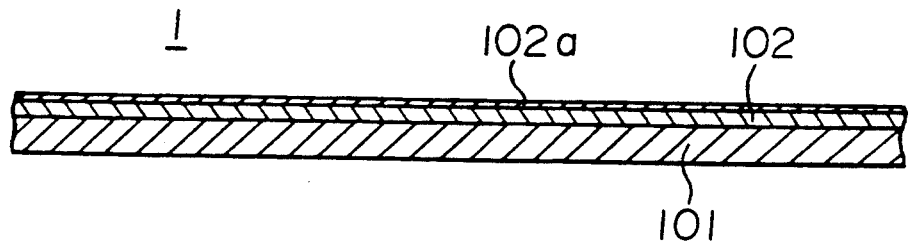
FIG. 3 is an enlarged cross-sectional view of a part of a magnetic disk constituting a magnetic recording and reproducing apparatus of the present invention.
Figure 4:
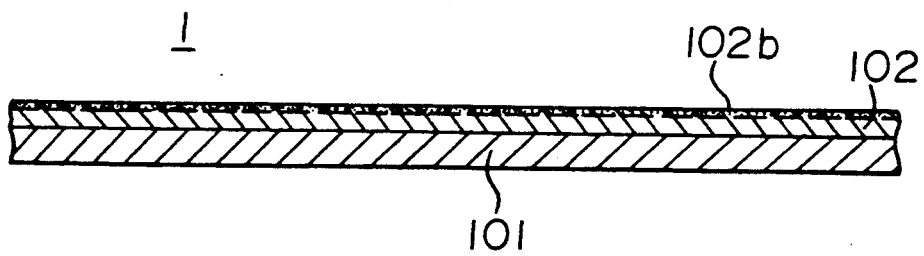
FIG. 4 is also an enlarged cross-sectional view of a part of magnetic disk according to another example.

FIG. 1 is a front view of a magnetic recording and reproducing apparatus of the present invention, and FIG. 2 is a plan view thereof. In the drawings, reference numeral 1 indicates a magnetic disk, numeral 2 indicates a magnetic head, numeral 3 indicates a gimbal supporting device, and numeral 4 indicates a positioning device for the head. Reference numeral 5 designates a control device such as a computer. The magnetic disk 1 is rotationally driven in the direction of an arrow a by a rotational drive mechanism (not shown). The magnetic head 2 is supported by the gimbal supporting device 3 and driven by the positioning apparatus 4 in the direction of an arrow $b_1$ and $b_2$ along the rotational diameter $O_1$ for positioning, whereby the magnetic recording or reproduction is conducted at a predetermined cylinder among $T_1$ to $T_n$.

In this case, the recording and reproducing are conducted in such a manner that the magnetic head 2 is lifted from the magnetic disk by a flying height g at at least an area of the outermost cylinder $T_n$ of the magnetic disk, and the magnetic disk 2 is brought substantially in contact with the surface of the magnetic disk 1 at least an area of the innermost cylinder $T_1$. With such construction, it is impossible to contact the magnetic head 2 with the magnetic disk 3 at the outer circumferential part where a damage is significantly increased if the magnetic head 2 contacts the magnetic disk 1, and therefore the durability is increased.

The recording and reproducing are conducted by bringing the magnetic head 2 substantially in contact with the magnetic disk 1 at an area of the innermost cylinder $T_1$, whereby a flying height at the outermost cylinder $T_1$ can be small; the spacing loss is reduced, and excellent recording/reproducing characteristics and recording density characteristics are obtainable.

When the magnetic head 2 is driven, an instruction of reading or writing is given to the positioning apparatus 4 from the control device 5. In accordance with the instructions, the positioning apparatus 4 moves the magnetic head 2 to a given position of cylinder by means of the supporting device 3 to thereby perform the recording and reproducing. In the magnetic recording and reproducing apparatus of this kind, the waiting time for receiving the reading or writing instruction from the control device is generally much longer than the time for the actual reading or writing operations. Therefore, when the reading or writing instruction is not received from the control device in a predetermined time, the magnetic head 2 is moved to a cylinder at the outer circumferential part in a flying standby state, for instance, and is moved above the outermost cylinder $T_n$. Thus, the durability is further improved.

The magnetic disk 1 is a medium having good surface properties with a surface roughness $R_{max}$ of at most 100 Å, preferably at most 50 Å. As shown in FIG. 3, the magnetic disk 1 comprises a rigid substrate 101 and a magnetic recording layer 102 formed on the surface of the substrate by a vacuum depositing method. The magnetic recording layer 102 is formed as a thin magnetic layer of e.g. $\gamma$-$Fe_2O_3$ or Co-Ni or Co-Cr. The thickness of the magnetic recording layer 102 formed by the vacuum depositing method is at most 0.5 $\mu$m, and therefore the surface properties of the rigid substrate 101 is reflected as the surface properties in the recording layer 102. Accordingly, as the rigid substrate 102, the one having a surface roughness $R_{max}$ of at most 100 Å is employed. As specific examples of such a rigid substrate, rigid substrates composed essentially of glass, chemically reinforced soda alumino silicate glass or ceramics are suitable.

When the surface roughness $R_{max}$ is at most 100 Å, especially at most 50 Å, a collision of the magnetic head 2 with the magnetic disk 1 can be avoided even when the flying height g at the outermost cylinder $T_n$ of the magnetic disk 1 is selected to be a small value, such as 0.01 $\mu$m–0.04 $\mu$m,. Therefore, the durability can be improved, the spacing loss can be reduced, and high density recording can be accomplished. The magnetic recording layer 102 may be constituted by a magnetic iron oxide such as $\gamma$-$Fe_2O_3$ or a magnetic nitride. Further, when the magnetic layer is made of a metal or alloy, it is advisable to form an oxide layer or a nitride layer 102a on its surface as shown in FIG. 3, or it is advisable to convert the surface into an oxidized coating film 102b. Thus, the durability of the magnetic recording layer 102 can be improved, and it is possible to prevent a damage to the magnetic disk 1 even when the recording or reproduction is conducted at a very low flying height or even at the time of the contact start and stop. The oxide layer or the nitride layer 102a can be formed by reactive sputtering or by reactive vapor deposition. The oxidized coating film 102b may be formed by intentionally oxidizing the surface of the magnetic recording layer 102 made of a metal or alloy containing at least one member of iron, cobalt and nickel, such as Co-Ni or Co-Cr, by e.g. reactive plasma treatment. The magnetic disk 1 may be of a vertical recording type wherein the recording residual magnetization is composed essentially of a component perpendicular to the recording layer or of an in-plane recording type wherein the recording residual magnetization is composed essentially of a component in the same plane as the recording layer. A lubricant may be coated on the surface of the magnetic recording layer 102 although such an embodiment is not shown in the drawings.

Figure 5:
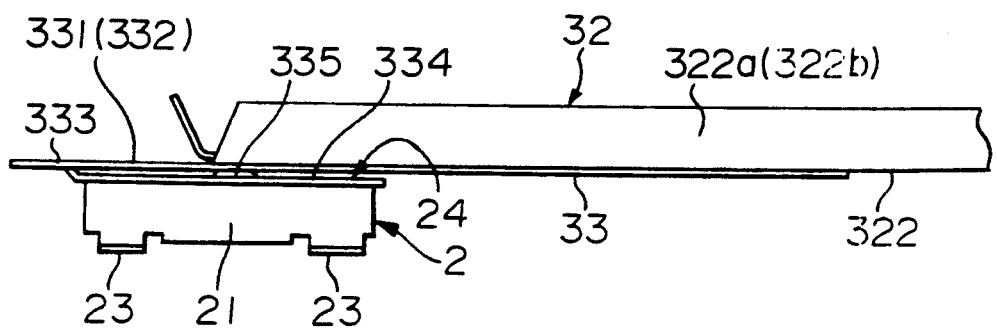
FIGS. 5 and 6 are views illustrating the assembly structure between a magnetic head and a supporting device.
Figure 6:
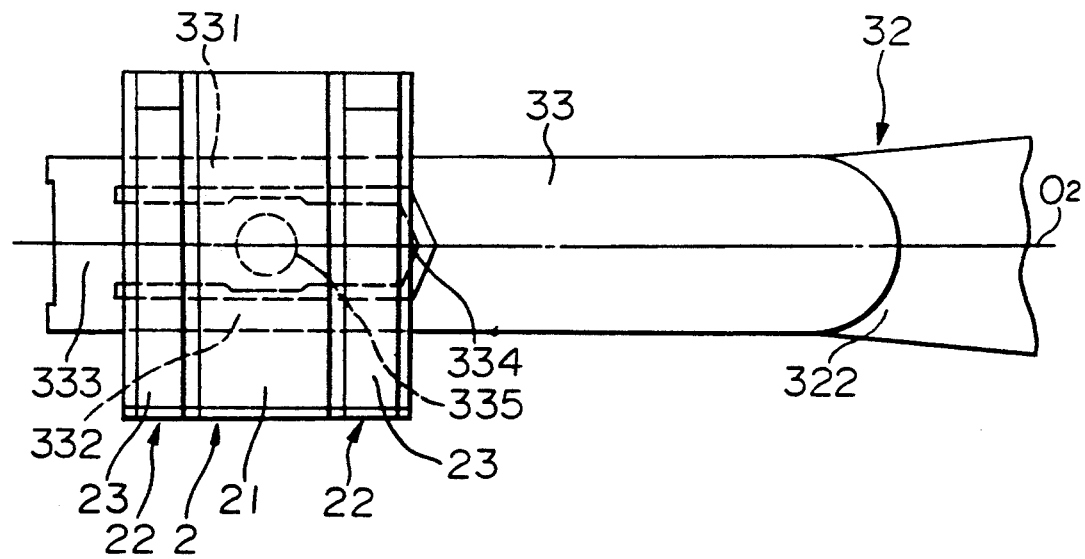

FIGS. 5 and 6 illustrate the assembly structure of the magnetic head 2 and the gimbal supporting device 3. The magnetic head 2 is provided with reading and writing elements 22 at the air discharge end of the slider 21 which is a ceramic structure and is supported for a pitching motion and a rolling motion by exerting a load to the surface 24 opposite to the flying surface 23 by the gimbal supporting device 3 driven by the positioning device 4. The reading and writing elements 22 are thin layer elements formed by a process similar to the technology for the production of an integrated circuit.

The supporting device 3 comprises a supporter 32 made of a resilient thin metal plate, one end of which is secured by fastening means 311 and 312 to a rigid arm 31, which is attached to the positioning apparatus 4. At the free end in the longitudinal direction of the supporter 32, a flexible member 33 made of the same thin metal plate is attached. On the lower surface of this flexible member 33, a magnetic head 2 is attached (FIGS. 1 and 2). The supporter 32 has a resilient spring portion 321 which is attached to the rigid arm 31. A rigid beam portion 322 is formed continuously from this resilient spring portion 321. The rigid beam portion 322 has flanges 322a and 322b formed by bending the beam portion along both sides. The flexible member 33 comprises two flexible outer frame portions 331 and 332 extending substantially in parallel with the axial line in the longitudinal direction of the supporter 32, a lateral frame 333 connecting the flexible outer frame portions 331 and 332 at the end far from the supporter 32 and a central tongue portion 334 extending substantially in parallel with the flexible outer frame portions 331 and 332 from about the center of the lateral frame 333 and having its forward end as a free end. One end opposite to the end having the lateral frame 333 is connected to near the free end of the supporter 32 by means of e.g. welding.

A loading projection 335 in a semi-spherical form is provided on the upper surface of the central tongue portion 334 of the flexible member 32 so that a loading force is transmitted from the free end of the supporter 32 to the central tongue portion 334. The surface 24 of the magnetic head 2 is bonded to the lower surface of the central tongue portion 334 by means of, for instance, an adhesive.

The shape of the magnetic head, and the rigidity and the spring pressure of the supporting device 3 are so determined taking account of the revolution member of the magnetic disk that the magnetic head 2 is floated from the magnetic disk 1 at at least the outermost cylinder $T_n$ of the disk 1, and the head is brought substantially into contact with the surface of the magnetic disk 1 at at least the innermost cylinder $T_1$ of the disk 1.

As described above, in accordance with the present invention, recording and reproducing are conducted by floating the magnetic head at at least the outermost cylinder of the magnetic disk and by bringing the head into contact with the surface of the magnetic disk at at least the innermost cylinder. Accordingly, a magnetic recording and reproducing apparatus capable of improving the durability of the disk and the head, reducing the spacing loss and accomplishing high density recording can be provided.

What is claimed is:

1. A magnetic recording and reproducing apparatus of a type wherein a magnetic disk having a magnetic recording layer formed on a rigid substrate is rotated at a high speed and magnetic recording and reproduction are conducted by a magnetic head disposed on a surface of the disk, said magnetic recording and reproducing apparatus being characterized in that the magnetic recording and reproducing are conducted by the magnetic head wherein said magnetic head is caused, by a control means, to fly from the magnetic disk over at least an area which is a perpendicular projection of a first outermost cylinder of the magnetic disk having a first radius so that recording and reproducing does not occur when said magnetic head flies over said area and said magnetic head is caused to be in contact with the surface of the magnetic disk at least in an area which is a perpendicular extension of a second innermost cylinder of the magnetic disk wherein when said magnetic head is in contact with the surface of the magnetic disk, recording and reproducing occur and wherein said second cylinder has a second radius less than said first radius.

2. The magnetic recording and reproducing apparatus according to claim 1, including a means for moving the magnetic head toward said cylinder at the outer circumference and a means for providing a flying standby state when an instruction of reading or writing which is to be given by a control device is not received in a predetermined time.

3. The magnetic recording and reproducing apparatus according to claim 1, wherein the surface roughness $R_{max}$ of the magnetic disk is at most 100 Å.

4. The magnetic recording and reproducing apparatus according to claim 1, wherein said substrate has a surface roughness $R_{max}$ of at most 100 Å.

5. The magnetic recording and reproducing apparatus according to claim 1, wherein said substrate is composed essentially of glass.

6. The magnetic recording and reproducing apparatus according to claim 1, wherein said substrate is made of ceramics.

7. The magnetic recording and reproducing apparatus according to claim 1, wherein the magnetic recording layer is a vacuum deposition layer.

8. The magnetic recording and reproducing apparatus according to claim 1, wherein the magnetic recording layer constitutes an oxide layer or a nitride layer at its surface layer.

9. The magnetic recording and reproducing apparatus according to claim 8, wherein wither the oxide layer or the nitride layer is formed by a reactive sputtering layer or a reactive vapor deposition layer, respectively.

10. The magnetic recording and reproducing apparatus according to claim 1, wherein the magnetic recording layer has an oxidized coating film at its surface.

11. The magnetic recording and reproducing apparatus according to claim 10, wherein the oxidized coating film is an oxidized surface of the magnetic recording layer composed of a metal or alloy comprising at least one member selected from the group consisting of iron, cobalt and nickel.

12. The magnetic recording and reproducing apparatus according to claim 1, wherein the recording residual magnetization of the magnetic disk is composed essentially of a component perpendicular to the magnetic recording layer.

13. The magnetic recording and reproducing apparatus according to claim 1, wherein the recording residual magnetization of the magnetic disk is composed essentially of a component in the same plane as the magnetic recording layer.

* * * * *